United States Patent
Kwag et al.

(10) Patent No.: US 9,219,259 B2
(45) Date of Patent: Dec. 22, 2015

(54) BATTERY PACK HAVING A SPACER DISPOSED BETWEEN BATTERY CELLS

(75) Inventors: Nohyun Kwag, Yongin-si (KR);
Youngho Kim, Yongin-si (KR);
Heongsin Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 985 days.

(21) Appl. No.: 12/591,938

(22) Filed: Dec. 4, 2009

(65) Prior Publication Data

US 2010/0143785 A1  Jun. 10, 2010

(30) Foreign Application Priority Data

Dec. 5, 2008 (KR) .................. 10-2008-0123204

(51) Int. Cl.
*H01M 2/10* (2006.01)
*H01M 2/18* (2006.01)

(52) U.S. Cl.
CPC .............. *H01M 2/1061* (2013.01); *H01M 2/18* (2013.01)

(58) Field of Classification Search
CPC .................................................. H01M 2/1061
USPC ........................................................ 429/148
See application file for complete search history.

(56) References Cited

U.S. PATENT DOCUMENTS

| | | | |
|---|---|---|---|
| 6,232,013 B1 * | 5/2001 | Clarke et al. ................... | 429/100 |
| 6,503,657 B1 * | 1/2003 | Takami et al. .................. | 429/188 |
| 2004/0070366 A1 * | 4/2004 | Takeshita et al. .............. | 320/107 |
| 2005/0202315 A1 | 9/2005 | Sugeno et al. | |
| 2005/0221175 A1 * | 10/2005 | Yoon .............................. | 429/164 |
| 2006/0267545 A1 | 11/2006 | Lee et al. | |
| 2009/0023057 A1 | 1/2009 | Kim | |
| 2009/0317703 A1 * | 12/2009 | Kwag et al. ................... | 429/159 |

FOREIGN PATENT DOCUMENTS

| | | |
|---|---|---|
| JP | 2005353722 | 12/2005 |
| JP | 2006040623 A * | 2/2006 |
| JP | 2008-071673 A | 3/2008 |
| JP | 2008071673 | 3/2008 |
| KR | 1020040110254 | 12/2004 |
| KR | 1020050075284 A | 7/2005 |
| KR | 1020070097852 | 10/2007 |
| KR | 100807030 | 2/2008 |
| KR | 100870355 B1 | 11/2008 |

OTHER PUBLICATIONS

JP 2006-040623 A Machine Translation, retrieved from JPO Jun. 7, 2012.*
JP 2008-071673 A Machine Translation, retrieved from JPO Jun. 4, 2012.*
Korean Notice of Allowance issued by KIPO, dated Dec. 23, 2010, corresponding to Korean Patent Application No. 10-2008-0123204, together with Request for Entry.

* cited by examiner

*Primary Examiner* — Barbara Gilliam
*Assistant Examiner* — Robert S Carrico
(74) *Attorney, Agent, or Firm* — Robert E. Bushnell, Esq.

(57) ABSTRACT

A battery pack is constructed with at least two battery cells that are arranged in parallel to each other and provided with surfaces facing each other, and a spacer structure interposed between the facing surfaces of the battery cells. A through-hole is formed in an interior portion of the spacer structure and corresponds to a portion where thicknesses of the battery cells are increased when the battery cells are swollen. Therefore, the facing battery cells do not interfere with each other even if the thickness of the battery cell is changed due to swelling of the middle portion thereof when the battery cells are repeatedly charged/discharged in the case where at least two battery cells are included.

11 Claims, 7 Drawing Sheets

BATTERY PACK HAVING A SPACER DISPOSED BETWEEN BATTERY CELLS

CLAIM OF PRIORITY

This application makes reference to, incorporates into this specification the entire contents of, and claims all benefits accruing under 35 U.S.C. §119 from an application earlier filed in the Korean Intellectual Property Office on Dec. 5, 2008, and there duly assigned Serial No. 10-2008-0123204.

BACKGROUND OF THE INVENTION

1. Field of the Invention

The present invention relates to a battery pack, and more particularly, to a battery pack that includes at least two battery cells.

2. Description of the Prior Art

Recently, a compact secondary battery exhibiting high performance and reliability has been keenly demanded with rapid development of electronic, telecommunication and computer industries.

Particularly, the secondary battery is indispensable to satisfy demands for mobile communication devices that are lightweight, small-sized and continuously usable for a long time. Accordingly, a demand for a high capacity of secondary battery has been gradually increasing in the market.

The high capacity of battery can be obtained by increasing a size of a cell, or by connecting a plurality of cells to each other in a single pack. The method of increasing the cell size is, however, retrogressive to the tendency of miniaturizing the battery. Therefore, it is desirable to stabilize and improve the performance of the battery while the plural cells are used in a single pack.

SUMMARY OF THE INVENTION

It is an object of the present invention to provide an improved battery packet.

It is another object to provide a battery pack that includes at least two battery cells.

It is still another object to provide a battery pack that can cope with thickness increase due to the swelling of middle portions of battery cells inside the battery pack when the battery cells are repeatedly charged and discharged in the case where at least two battery cells are included.

Additional advantages, objects and features of the invention will be set forth in part in the description which follows and in part will become apparent to those having ordinary skill in the art upon examination of the following or may be learned from practice of the invention.

According to one aspect of the present invention, a battery pack is constructed with at least two battery cells that are arranged in parallel to each other and are provided with surfaces facing each other, and a spacer structure interposed between the facing surfaces of the battery cells.

A through-hole may be formed in an interior portion of the spacer structure.

The through-hole may be formed to correspond to a portion where thicknesses of the battery cells increase when the battery cells are swollen.

Each of the battery cells may be formed in a roughly cubic shape whose side surface includes two wide surfaces and two narrow surfaces, and the spacer structure may be interposed between the wide surfaces of the battery cells.

The spacer structure may be provided to surround sides of the wide surfaces of the battery cells.

The spacer structure may be provided along a pair of opposite sides of the wide surfaces of the battery cells.

The spacer structure may be provided at corners of the wide surfaces of the battery cells.

A thickness (t) of the spacer structure may be less than $(T/10)*2$, where T is a thickness of one of the battery cells.

The thickness (t) of the spacer structure may be less than 1.1 mm when the thickness of one of the battery cells is 5.5 mm.

The spacer structure may be a double-sided tape.

The double-sided tape may be a foam tape to absorb impact.

The battery pack may further include a Protection Circuit Module (PCM) assembly electrically coupled to the battery cells, a coupling tab that electrically couples the battery cells to the PCM assembly, a top case combined with upper parts of the battery cells, where the PCM assembly is received therein, and a bottom case combined with lower parts of the battery cells.

The battery pack may further a label to surround side surfaces of the battery cells.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF EXEMPLARY EMBODIMENTS

Figure 1:
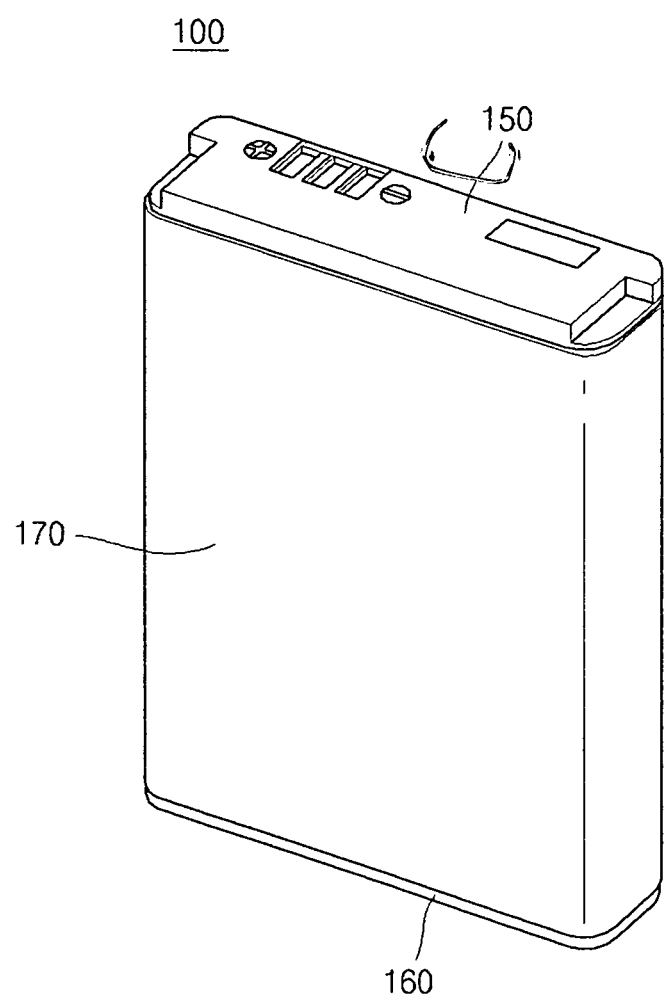
FIG. 1 is an oblique view illustrating a battery pack constructed as an exemplary embodiment according to the principles of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Figure 2:
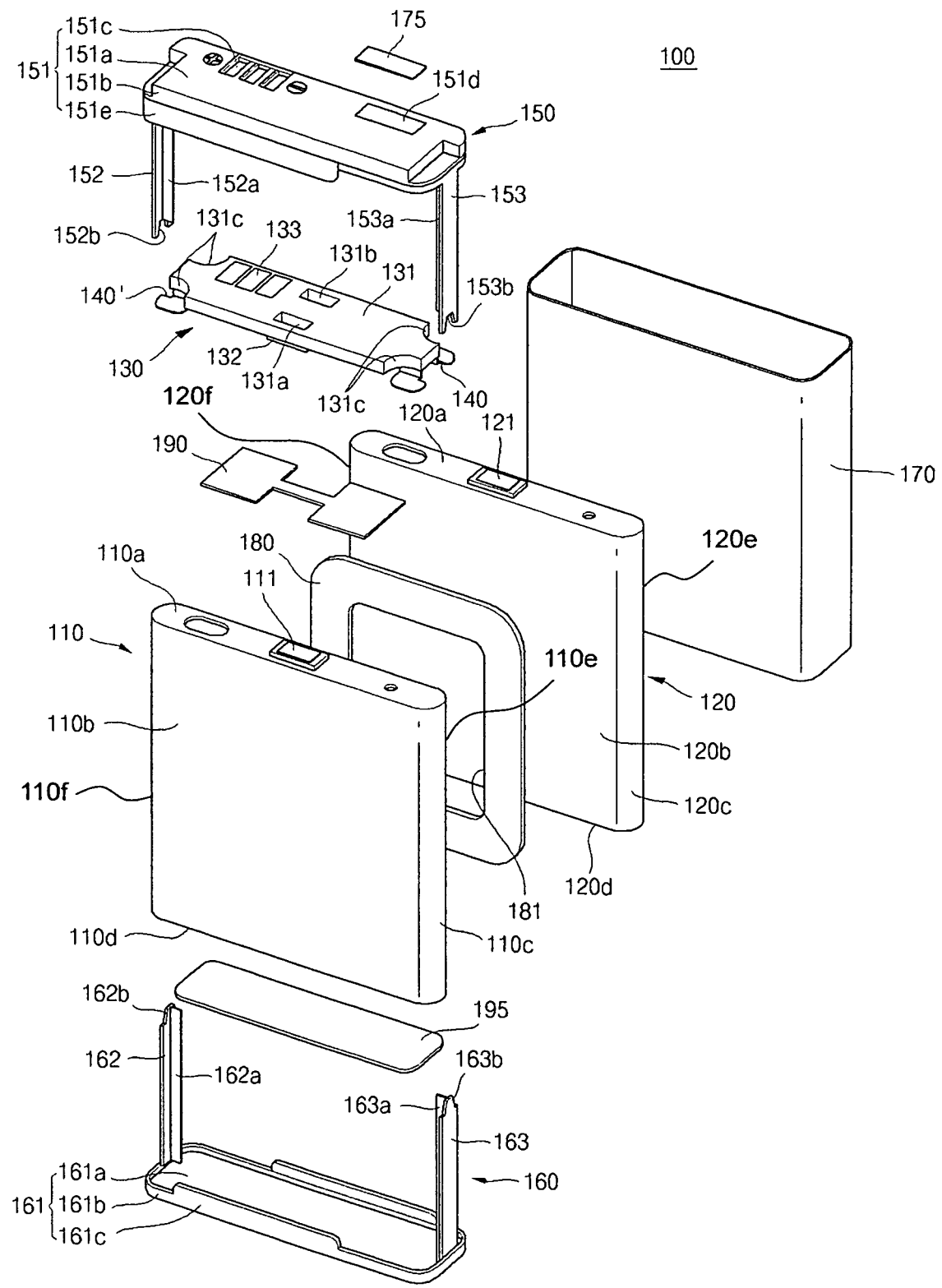
FIG. 2 is an exploded oblique view illustrating the battery pack of FIG. 1.
Figure 3:
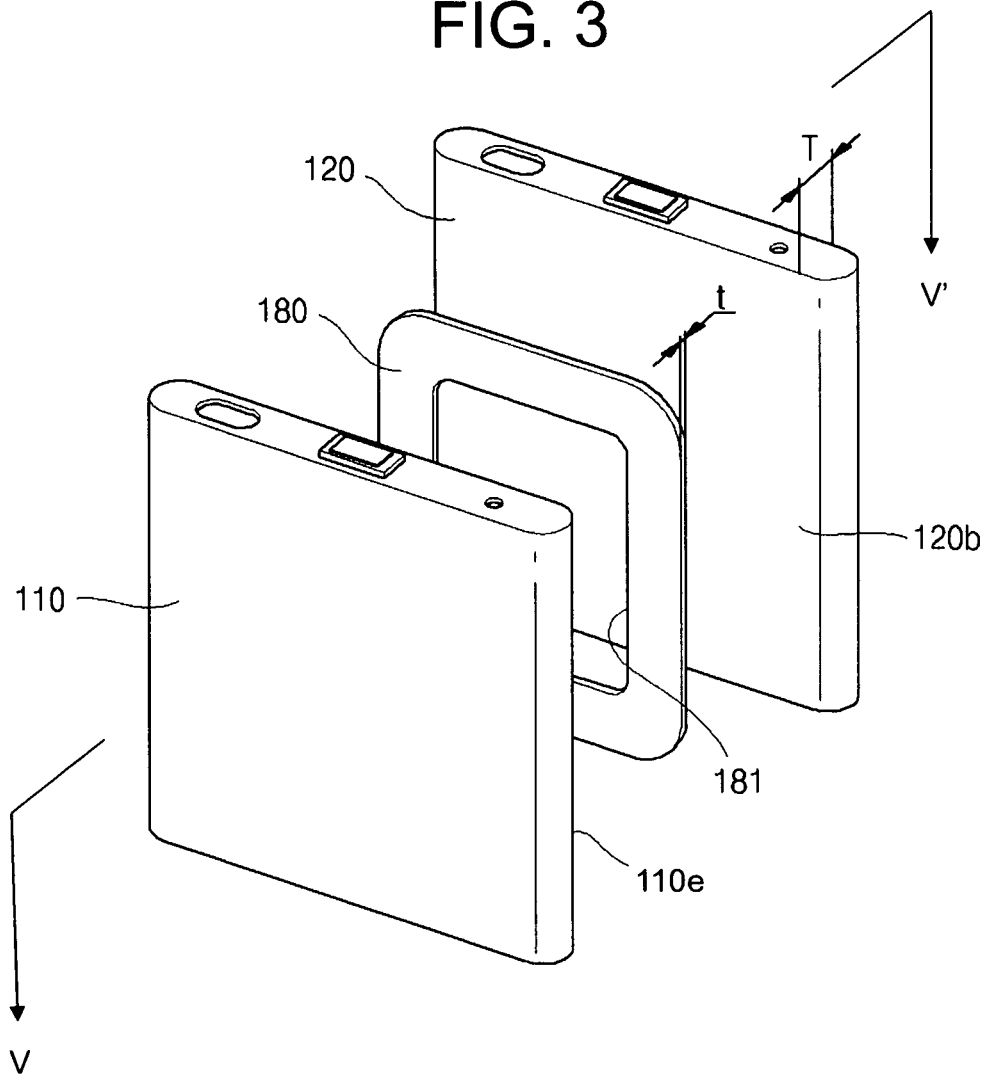
FIG. 3 is an oblique view illustrating a state when a spacer structure according to one exemplary embodiment of the principles of the present invention is combined with battery cells.

Referring to FIGS. 1 to 3, a battery pack 100 is constructed with a first battery cell 110, a second battery cell 120 electrically coupled to first battery cell 110, a Protection Circuit Module (PCM) assembly 130 electrically coupled to first and second battery cells 110 and 120, a coupling tab 140 electrically coupling first and second battery cells 110 and 120 to PCM assembly 130, a top case 150 combined with upper parts of first and second battery cells 110 and 120, where PCM assembly 130 is received therein, a bottom case 160 combined with lower parts of first and second battery cells 110 and 120, and a label 170 surrounding side surfaces of first and second battery cells 110 and 120.

First and second battery cells 110 and 120 are formed in a roughly cubic shape, but the present invention is not limited thereto. Anode terminals 111 and 121 respectively protrude out of upper surfaces 110a and 120a of first and second battery cells 110 and 120. A side surface of first battery cell 110 includes two wide surfaces 110b and 110e and two narrow surfaces 110c and 110f; and a side surface of second battery cell 120 includes two wide surfaces 120b and 120e and two narrow surfaces 120c and 120f. Lower surfaces 110d and 120d of first and second battery cells 110 and 120 are formed integrally with the wide and narrow surfaces thereof respectively.

First and second battery cells 110 and 120 are attached to each other in a state that wide surface 110e of first battery cell 110 and wide surface 120b of second battery cell 120 face each other.

In this time, a spacer structure 180 is interposed between wide surface 110e of first battery cell 110 and wide surface 120b of second battery cell 120 in order to keep a gap between first and second battery cells 110 and 120.

A through-hole 181 is formed in an interior region of spacer structure 180.

Through-hole 181 is formed at a position corresponding to a portion where thicknesses of first and second battery cells 110 and 120 increase when the battery cells are swollen due to charging and discharging of the battery cells.

Generally, the thickness of the battery cell gradually increases from an edge thereof toward the middle portion when the battery cell is swollen due to charging and discharging. In other words, the entire wide surface except for the edge of the wide surface is swollen in the battery cell.

Therefore, it is desirable to form through-hole 181 of spacer structure 180 at the portion except for the edge. Through-hole 181 is formed at an interior region of spacer structure 180. Accordingly, it is desirable that spacer structure 180 is formed in a roughly rectangular shape.

A thickness of spacer structure 180 corresponds to the thickness increase of first and second battery cells 110 and 120. Experimentally, the amount of the thickness increase is within 10% of the maximum thickness of the battery cell.

Accordingly, in the case where a thickness of one rectangular battery cell is 5.5 mm, a gap of less than 1.1 mm should be kept between two facing battery cells because the amount of the thickness increase of one battery cell is 0.55 mm at maximum.

Therefore, it is desirable that thickness t of spacer structure 180 is less than $(T/10)*2$, where T is the thickness of a battery cell.

The material of spacer structure 180 is not limited as long as spacer structure 180 can be interposed between first and second battery cells 110 and 120, and can keep an original shape thereof when the battery cells are swollen due to repetitive charging and discharging.

It is desirable to use a double-sided tape made of a material that can be simultaneously attached to wide surfaces 110e and 120b of first and second battery cells 110 and 120, for forming spacer structure 180. Alternatively, it is desirable to use a double-sided foam tape that can secure a predetermined thickness and absorb external impact, for forming spacer structure 180.

When spacer structure 180 is not a kind of tape, an adhesive is applied on the portion of spacer structure 180 where spacer structure 180 contacts wide surfaces 110e and 120b of first and second battery cells 110 and 120.

PCM assembly 130 includes a circuit board 131, an electrical circuit element 132 installed on circuit board 131, and an external terminal 133 to transfer current of battery pack 100 to the outside.

Circuit board 131 is formed in a rectangular shape having a width that corresponds to the combined width of upper surfaces 110a and 120a of first and second battery cells 110 and 120. Terminal holes 131a and 131b are formed in the middle of circuit board 131 in order to connect anode terminals 111 and 121 of first and second battery cells 110 and 120 to an anode terminal (not shown) of circuit board 131. A cut part 131c is formed at each of four corners of circuit board 131. Cut part 131c is formed in order to facilitate welding of coupling tab 140 to upper surfaces 110a and 120a of first and second battery cells 110 and 120.

Coupling tab 140 includes first and second coupling tabs 140 and 140' that are respectively provided at right and left ends of the lower surface of circuit board 131. Accordingly, first and second coupling tabs 140 and 140' support circuit board 131 and are seated on upper surfaces 110a and 120a of first and second battery cells 110 and 120.

Circuit board 131 is electrically coupled to first and second battery cells 110 and 120 simultaneously by first and second coupling tabs 140 and 140'. In this structure, first and second battery cells 110 and 120 are connected in parallel to each other.

First and second coupling tabs 140 and 140' electrically couples cathode terminals (surfaces of the battery cells) of first and second battery cells 110 and 120 to the cathode terminal (not shown) of circuit board 131. At least one of first and second coupling tabs 140 and 140' electrically couples first and second battery cells 110 and 120 to circuit board 131. First and second coupling tabs 140 and 140' may be made from nickel or nickel alloy having good conductivity, but is not limited thereto. In other words, any one of first and second coupling tabs 140 and 140' that electrically couples first and second battery cells 110 and 120 to circuit board 131 may be made from nickel having good conductivity, and the other one of first and second coupling tabs 140 and 140' may not be made from conductive material.

Top case 150 includes a case body 151, and right and left frames 152 and 153. Case body 151 is rectangular and has a space to receive PCM assembly 130 inside. Right and left frames 152 and 153 are integrally formed from right and left ends of case body 151, respectively. Case body 151 includes one flat surface 151a and four side surfaces 151b extending from an edge of flat surface 151a. An external terminal hole 151c is formed at one side of flat surface 151a and a water sensitive paper attachment part 151d is formed at the other side. A guide rib 151e extends from four side surface 151b, and label 170 is attached to guide rib 151e. Right and left frames 152 and 153 are formed in perpendicular to case body 151. Protruding parts 152a and 153a are respectively formed in the middle portions of inner surfaces of right and left frames 152 and 153. Protruding parts 152a and 153a extend in the lengthwise direction of right and left frames 152 and 153, respectively.

Bottom case 160 includes a case body 161, and right and left frames 162 and 163. Case body 161 is rectangular and has a size to receive the lower parts of first and second battery cells 110 and 120. Right and left frames 162 and 163 are integrally formed from right and left ends of case body 161, respectively. Case body 161 includes one flat surface 161a and a bent surface 161b extending from an edge of flat surface 161a. A guide rib 163c is formed at both sides of flat surface 161a, and label 170 is attached to guide rib 161c. Right and left frames 162 and 163 are formed in perpendicular to case body 161. Protruding parts 162a and 163a are respectively formed in the middle portions of inner surfaces of right and left frames 162 and 163. Protruding parts 162a and 163a may extend in the lengthwise direction of right and left frames 162 and 163, respectively.

Grooves 152b and 153b are respectively formed at lower ends of right and left frames 152 and 153 of top case 150. In addition, projections 162b and 163b are respectively formed at upper ends of right and left frames 162 and 163, so that projections 162b and 163b can be inserted into grooves 152b and 153b, respectively. Grooves 152b and 153b, and projections 162b and 163b may have any shapes as long as they can couple to each other in a male and female manner.

Label 170 is attached to surround first and second battery cells 110 and 120, and top case 150 and bottom case 160 for at least one turn in a state that first and second battery cells 110 and 120, top case 150 and bottom case 160 are combined with each other. Label 170 is made of an insulating material to insulate first and second battery cells 110 and 120 from the outside.

An end of upper part of label 170 surrounds guide rib 151e of top case 150 and an end of lower part of label 170 surrounds guide rib 161c of bottom case 160. Accordingly, top case 150 and bottom case 160 are combined with first and second battery cells 110 and 120, respectively.

An electrical insulation tape 190 is attached to upper surfaces 110a and 120a of first and second battery cells 110 and 120. First and second battery cells 110 and 120 are electrically insulated from PCM assembly 130 by electrical insulation tape 190.

In addition, a dot tape 195 is attached to lower surfaces 110d and 120d of first and second battery cells 110 and 120.

Dot tape 195 strongly attaches first and second battery cells 110 and 120 to each other. Dot tape 195 may be a double-sided adhesive tape. Accordingly, bottom case 160 is attached to lower surfaces 110d and 120d of first and second battery cells 110 and 120 by dot tape 195.

Operation of the battery pack as described above will be explained with reference to FIG. 5 below.

Figure 5:
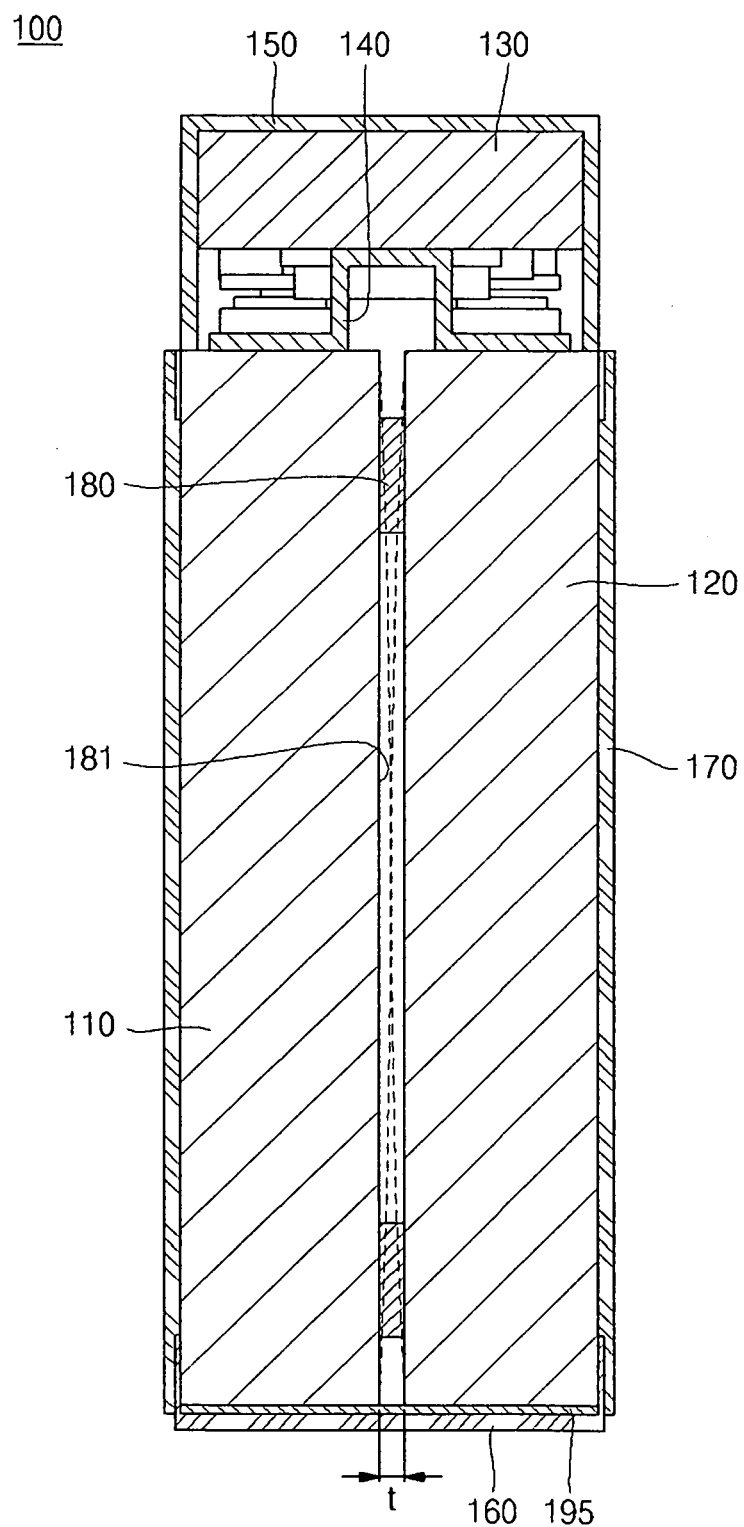
FIG. 5 is a sectional view taken along section line V-V' of the battery illustrated in FIG. 3.

When first and second battery cells 110 and 120 are swollen due to charging of the battery, thicknesses of the battery cells change from a state shown as solid lines to a state shown as dotted lines in FIG. 5. In other words, the middle portions of first and second battery cells 110 and 120 are swollen and thus thicknesses of the middle portions of first and second battery cells 110 and 120 increase. In this time, the swollen portions of first and second battery cells 110 and 120 are located in through-hole 181 of spacer structure 180 attached between first and second battery cells 110 and 120.

Experimentally, a thickness increase of a battery cell does not exceed 10% of the battery thickness T after 500 charging/discharging cycles. The experimental examples are shown in Table 1. As shown in Table 1, the thickness increase $\Delta T(\%)$ did not exceed 10% in all examples except for the example 6.

TABLE 1

| No | 1 cycle Thickness increase of battery cell $\Delta T$ | 100 cycles Thickness increase of battery cell$\Delta T$ | 200 cycles Thickness increase of battery cell$\Delta T$ | 300 cycles Thickness increase of battery cell$\Delta T$ | 400 cycles Thickness increase of battery cell$\Delta T$ | 500 cycles Thickness increase of battery cell$\Delta T$ |
|---|---|---|---|---|---|---|
| Example1 | 0.0% | 2.9% | 3.6% | 5.9% | 6.7% | 8.7% |
| Example2 | 0.0% | 3.1% | 4.4% | 6.1% | 7.1% | 8.9% |
| Example3 | 0.0% | 2.7% | 3.6% | 4.8% | 5.0% | 5.9% |
| Example4 | 0.0% | 2.7% | 3.4% | 5.5% | 5.7% | 7.1% |
| Example5 | 0.0% | 3.1% | 4.0% | 5.5% | 5.9% | 7.8% |
| Example6 | 0.0% | 3.1% | 4.2% | 5.9% | 6.1% | 11.0% |
| Example7 | 0.0% | 2.9% | 3.8% | 5.2% | 5.7% | 6.9% |
| Example8 | 0.0% | 2.5% | 3.6% | 4.8% | 5.0% | 5.9% |

Accordingly, the swollen first and second battery cells 110 and 120 do not interfere (contact) with each other due to a gap between first and second battery cells 110 and 120 secured by thickness t of spacer structure 180.

In a conventional battery pack formed without the spacer structure of the present invention, if the thicknesses of first and second battery cells 110 and 120 gradually increase from the edges thereof toward the middle portions, first and second battery cells 110 and 120 may undesirably contact each other at the middle portions thereof, and the gap between the edge portions of first and second battery cells 110 and 120 increases. Accordingly, coupling tab 140 electrically coupling first and second battery cells 110 and 120 could not keep the coupling state between them. In addition, the entire thickness of battery pack 100 may be excessively increased, thereby causing damage of the mobile phone using the battery pack.

In the battery pack constructed as an embodiment according to the principles of the present invention, spacer structure 180 is provided between first and second battery cells 110 and 120. Thus, first and second battery cells 110 and 120 keep the initial combined state without pushing each other even if the battery cells are repeatedly swollen.

Next, a spacer structure according to other embodiments of the principles of the present invention will be explained below.

Figure 6:
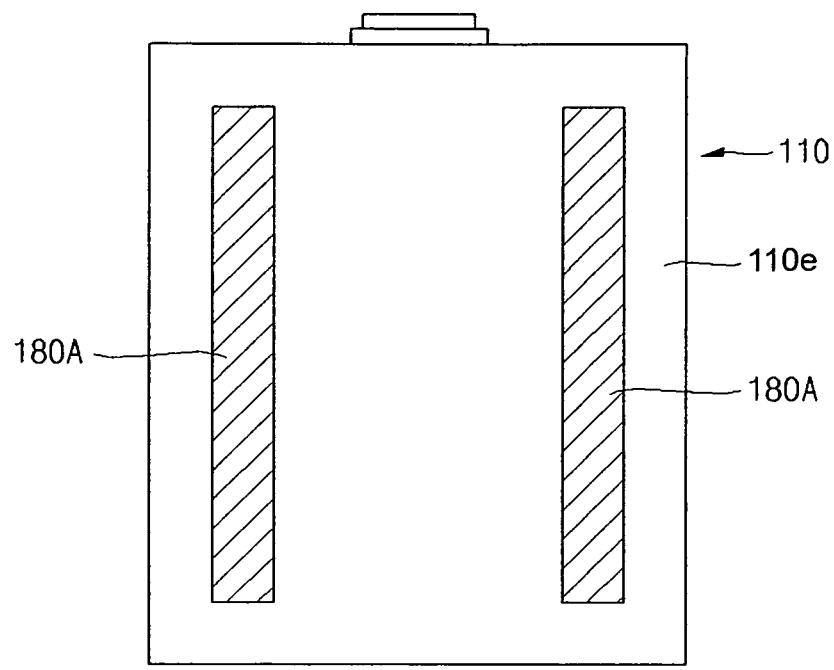
FIG. 6 is a front view illustrating a state when a spacer structure is provided along a pair of long sides of a wide surface of a battery cell as another exemplary embodiment according to the principles of the present invention.
Figure 7:
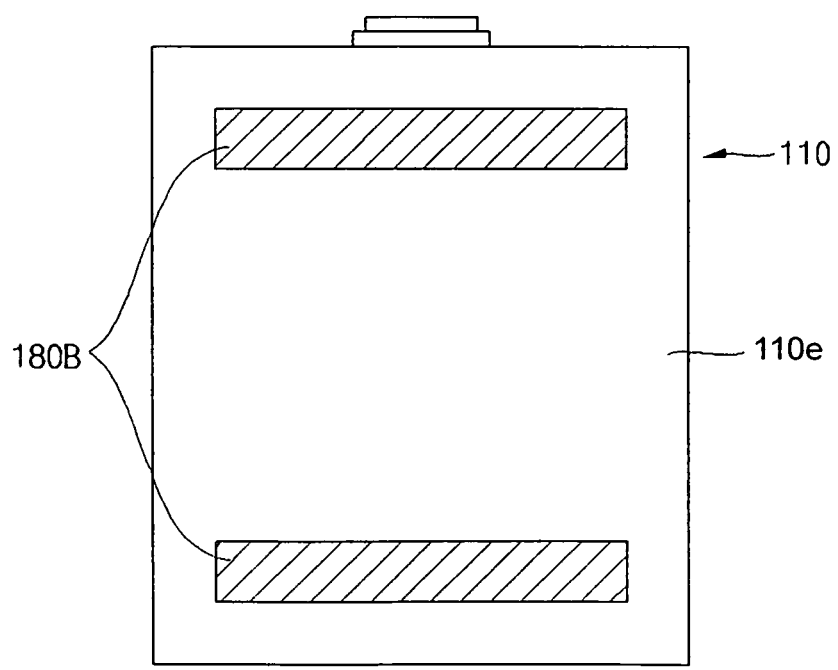
FIG. 7 is a front view illustrating a state when a spacer structure is provided along a pair of short sides of a wide surface of a battery cell as still another exemplary embodiment according to the principles of the present invention.
Figure 8:
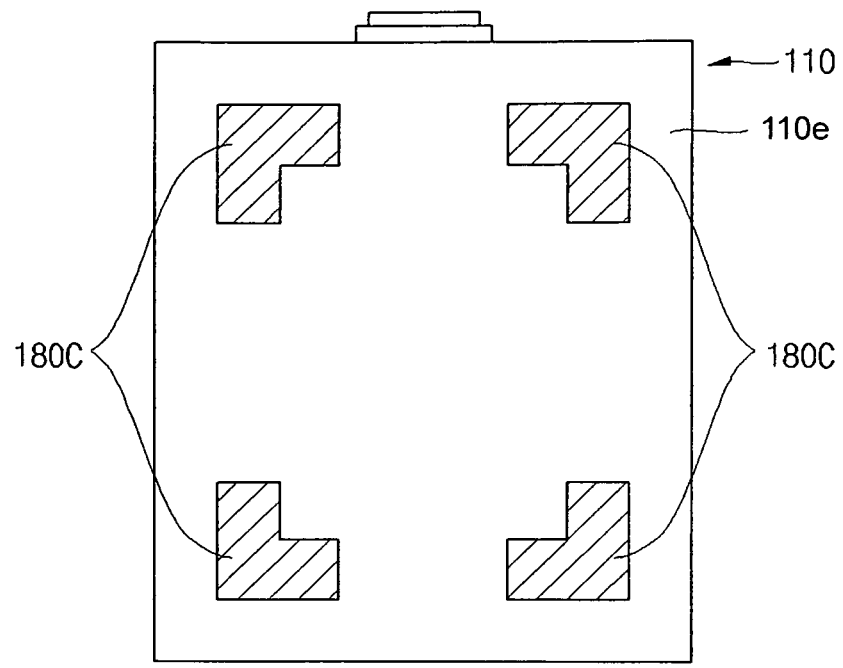
FIG. 8 is a front view illustrating a state when a spacer structure is provided at each corner of a wide surface of a battery cell as a further exemplary embodiment according to the principles of the present invention.

FIGS. 6 to 8 are front views illustrating battery cells to which spacer structures according to other exemplary embodiments are attached.

Referring to FIG. 2, first and second battery cells 110 and 120 have roughly cubic shapes. A side surface of first battery cell 110 includes two wide surfaces 110b and 110e and two narrow surfaces 110c and 110f; and a side surface of second battery cell 120 includes two wide surfaces 120b and 120e and two narrow surfaces 120c and 120f. A spacer structure 180 is interposed between wide surfaces 110e and 120b of first and second battery cells 110 and 120.

Figure 4:
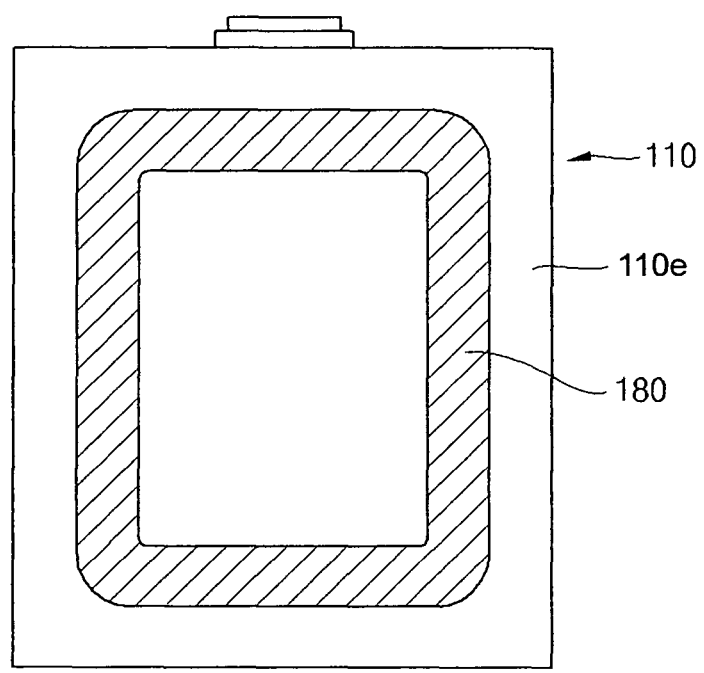
FIG. 4 is a front view illustrating the battery cell to which the spacer structure is attached as an exemplary embodiment according to the principles of the present invention.

Referring to FIG. 4, spacer structure 180 is provided to surround the opposite sides of wide surface 110e of first battery cell 110.

Accordingly, secondary battery cell 120 is arranged to be spaced-apart from first battery cell 110 by a predetermined gap with spacer structure 180 interposed between them, where wide surfaces 110e and 120b of first and second battery cells 110 and 120 contact to each other. First and second battery cells 110 and 120 do not interfere with each other due to spacer structure 180 even if the thicknesses of the battery cells change because of swelling.

FIG. 6 shows another embodiment according to the principles of the present invention in which a spacer structure 180A is provided at only the long sides of wide surface 110e of first battery cell 110.

FIG. 7 shows still another embodiment according to the principles of the present invention in which a spacer structure 180B is provided at only the short sides of wide surface 110e of first battery cell 110.

As described above, even if spacer structure 180A is provided at only the long sides of wide surface 110e of first battery cell 110 as shown in FIG. 6, or spacer structure 180B is provided at only the short sides of wide surface 110e of first battery cell 110 as shown in FIG. 7, first and second battery cells 110 and 120 are spaced-apart from each other by a predetermined gap with spacer structure 180A or 180B interposed between them. In addition, first and second battery cells 110 and 120 do not interfere with each other due to spacer structure 180 even if the thicknesses of the battery cells change because of swelling.

FIG. 8 shows still another embodiment according to the principles of the present invention in which a spacer structure 180C is provided at each corner of wide surface 110e of first battery cell 110. In this embodiment, spacer structure 180C provides the same function and effect as the embodiments described above.

As described above, the present invention can be suitably applied to a battery pack with at least two battery cells and the battery pack according to the present invention produces following effects.

In the case where at least two battery cells are included and facing each other, the facing battery cells do not interfere with each other even if the thicknesses of the battery cells change due to swelling of the middle portions thereof when the battery cells are repeatedly charged/discharged.

It is possible to prevent an electronic device such as a mobile phone provided with the battery pack from being damaged due to thickness increase of the battery pack caused by interference between the battery cells.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A battery pack, comprising:
   at least two battery cells that are arranged in parallel to each other and provided with surfaces facing each other, each of the at least two battery cells has a rectangular prism shape and the surfaces facing each other have a rectangular shape with two short sides and two long sides, the long sides are longer than the short sides; and
   a spacer structure consisting of two rectangular geometric prisms positioned along the long sides of the facing surfaces, the spacer structure creates an void between the two rectangular geometric prisms, the spacer structure is interposed between and entirely encompassed within outer edges of the facing surfaces of the battery cells, said spacer structure is an adhesive member that is in direct contact with both of said surfaces facing each other of the at least two battery cells with no intervening structures,
   said void is centered upon each of the facing surfaces of the battery cells and in the middle of the spacer structure corresponding to portions of the battery cells where thicknesses of the battery cells increase when the battery cells are swollen,
   wherein the spacer structure is of a size that is smaller than areal surface of the facing surfaces of the battery cells,
   wherein the thickness (t) of each of the two rectangular geometric prisms of the spacer structure is less than $(T/10)*2$ and greater than $(T/10)$ where T is a non-swollen thickness of one of the battery cells.

2. The battery pack of claim 1, where in the spacer structure is provided to surround sides of the wide surfaces of the battery cells.

3. The battery pack of claim 1, where in the spacer structure is provided along a pair of opposite sides of the wide surfaces of the battery cells.

4. The battery pack of claim 1, where in the spacer structure is provided at corners of the wide surfaces of the battery cells.

5. The battery pack of claim 1, wherein the thickness (t) of the spacer structure is less than 1.1 mm when the thickness of one of the battery cells is 5.5 mm.

6. The battery pack of claim 1, wherein the spacer structure is a double-sided tape.

7. The battery pack of claim 6, where in the double-sided tape is a foam tape to absorb impact.

8. The battery pack of claim 1, further comprising:
   a Protection Circuit Module (PCM) assembly electrically coupled to the battery cells;
   a coupling tab that electrically couples the battery cells to the PCM assembly;
   a top case combined with upper parts of the battery cells, where the PCM assembly is received therein; and
   a bottom case combined with lower parts of the battery cells.

9. The battery pack of claim 1, further comprising a label to surround side surfaces of the battery cells.

10. A battery pack, comprising:
    at least two battery cells arranged in parallel to each other and provided with surfaces facing each other, each of the at least two battery cells has a rectangular prism shape and the surfaces facing each other have a rectangular shape with two short sides and two long sides; and
    a spacer structure consisting of two rectangular geometric prisms positioned along the short sides the facing surfaces, the spacer structure is interposed between and entirely encompassed within outer edges of the facing surfaces of the battery cells, the spacer structure forms a void between the two rectangular geometric prisms corresponding to portions of the battery cells where thicknesses of the battery cells increase when the battery cells are swollen, wherein said spacer structure is an adhesive member that is in direct contact with both of said surfaces facing each other of the at least two battery cells with no intervening structures, wherein the spacer structure is of a size that is smaller than areal surface of the facing surfaces of the battery cells, wherein a thickness (t) of each of the two rectangular geometric prisms of the spacer structure is less than (T/10)*2 and greater than (T/10), where T is a non-swollen thickness of one of the battery cells.

11. A battery pack, comprising:
at least two battery cells arranged in parallel to each other and provided with surfaces facing each other, with the facing surfaces of the battery cells being roughly rectangular; and a spacer structure consisting of four "L" shaped geometric prisms with one of the four "L" shaped geometric prisms positioned in each corner of the facing surfaces, the spacer structure is interposed between and entirely encompassed within outer edges of the facing surfaces of the battery cells, with the spacer structure forms a void between the four "L" shaped geometric prisms, said spacer structure is an adhesive member that is in direct contact with both of said surfaces facing each other of the at least two battery cells with no intervening structures, said void is located to correspond to portions of the battery cells where thicknesses of the battery cells increase when the battery cells are swollen, wherein the spacer structure is of a size that is smaller than areal surface of the facing surfaces of the battery cells, wherein a thickness (t) of each of the four "L" shaped geometric prisms of the spacer structure is less than (T/10)*2 and greater than (T/10), where T is a non-swollen thickness of one of the battery cells.

* * * * *